United States Patent [19]
Okuda
[11] Patent Number: 4,746,931
[45] Date of Patent: May 24, 1988

[54] THERMAL HEAD TEMPERATURE CONTROL DEVICE

[75] Inventor: Akira Okuda, Iwate, Japan
[73] Assignee: Kabushiki Kaisha Sato, Japan

[21] Appl. No.: 846,967
[22] Filed: Apr. 1, 1986
[30] Foreign Application Priority Data
Apr. 8, 1985 [JP] Japan .................................. 60-72589
[51] Int. Cl.⁴ .......................... G01D 15/10; B41J 3/20
[52] U.S. Cl. ................................ 346/76 PH; 400/120
[58] Field of Search ..................... 346/76 PH; 400/120

[56] References Cited
U.S. PATENT DOCUMENTS
4,168,421 9/1979 Ito .................................. 219/216 X
4,300,142 11/1981 Kos ............................... 346/76 PH
4,494,126 1/1985 Todoh ........................... 346/76 PH
4,514,737 4/1985 Suzuki ........................... 346/76 PH

*Primary Examiner*—E. A. Goldberg
*Assistant Examiner*—Gerald E. Preston
*Attorney, Agent, or Firm*—Ostrolenk, Faber, Gerb & Soffen

[57] ABSTRACT

The temperature of and thereby the amount of heat that is generated by the printing elements in a thermal printing head is controlled by controlling the electrical power supply for the thermal printing head. The control takes into account different printing requirements of ordinary characters, bar codes, and the like. Data on various types of printing are stored in memory for reference thereto by the temperature control. The result is printing that is sharper and more uniform.

9 Claims, 5 Drawing Sheets

THERMAL HEAD TEMPERATURE CONTROL DEVICE

BACKGROUND OF THE INVENTION

This invention relates to a temperature control device for controlling the temperature of a thermal head used in a thermal printer, and more particularly to controlling the temperature of the heating elements in a thermal head by varying the electric current supplied to the head as a function of the printing conditions.

It is known that the temperature of the heating elements of a thermal printing head at the start of printing differs from their temperature during the course of printing. This will occur even though the amount and duration of current in the heating elements is the same for both instances. This happens because the temperature of the heating element drops after the start of the printing operation. Further, the optimum temperature for printing may vary depending upon the form of the characters that are being printed, such as a bar code, ordinary characters or the like.

A number of techniques have been employed to achieve optimum printing under varied conditions. One approach was to eliminate the difference between the temperature at the start of printing and that during the course of printing. This is done by preheating the thermal head at the time that the print head power supply is turned on, thereby maintaining the start temperature at approximately the same level as the print temperature. However, while this technique will control the temperature during the course of printing, it does not control the temperature in accordance with the nature of the characters being printed by the heating elements.

In order the heating elements to be at a temperature that is suitable for the characters being printed, there are known techniques for appropriately varying electric current as a function of printing ordinary characters or bar codes. Such techniques employ power supply circuitry which can generate two or three different voltages. The flow of current through the heating elements is changed by switching circuits to vary the voltage according to the nature of what is being printed. While this permits some measure of heating temperature control, fine control of temperature during printing is still not possible, because switching is still limited to two or three different voltages. An example of the problem is illustrated by the Bar Code I shown in FIG. 1. As the printing proceeds in the direction of the arrow, the temperature of each heating element rises as the printing progresses. This causes gradual thickening toward the end of the bar.

Another technique of temperature control is to detect the temperature of the thermal head and adjust the power supply circuit, so that the power supplied to the thermal head is in an amount which is appropriate to the required temperature. This allows a more precise level of control, as the right amount of power in view of the current temperature, is supplied. However, this technique is flawed since it is not detecting the actual change in temperature of each heating element. What is instead detected is the heat of the head board for the heating elements. It is therefore difficult to detect temperature changes precisely. Additionally, rapid fine temperature control is impossible because of thermal delay caused by the time it takes the heat to be conducted by the head board and the like. This technique therefore does not present an easy solution to the bar thickening problem seen in FIG. 1.

SUMMARY OF THE INVENTION

An object of the present invention is to provide a thermal head temperature control device which enables accurate, fine control of the heating elements of a thermal printing head during the course of printing.

This object is attained by providing a thermal print head which uses a power supply data memory in which there is stored information on the electric power requirement of the thermal print head for each printing condition. In this manner, electric power is supplied to the thermal print head in accordance with the printing conditions by referring to the stored data, rather than by attempted temperature measurements for the thermal head.

The invention provides a thermal printing head temperature control device for thermal print elements which print characters such as bar codes, ordinary characters, and the like. A power supply supplies electric power to the thermal printing head. A power supply data memory has stored therein printing data for each variety of print type to be printed. A control device connected to the thermal printing head and to the power supply and to the power supply data memory controls the electric power supplied to the thermal printing head by the power supply as a function of the print type which is to be printed.

Other objects and features of the invention will be apparent from the following description of embodiments shown in the accompanying drawings.

DESCRIPTION OF THE PREFERRED EMBODIMENT

Figure 2:
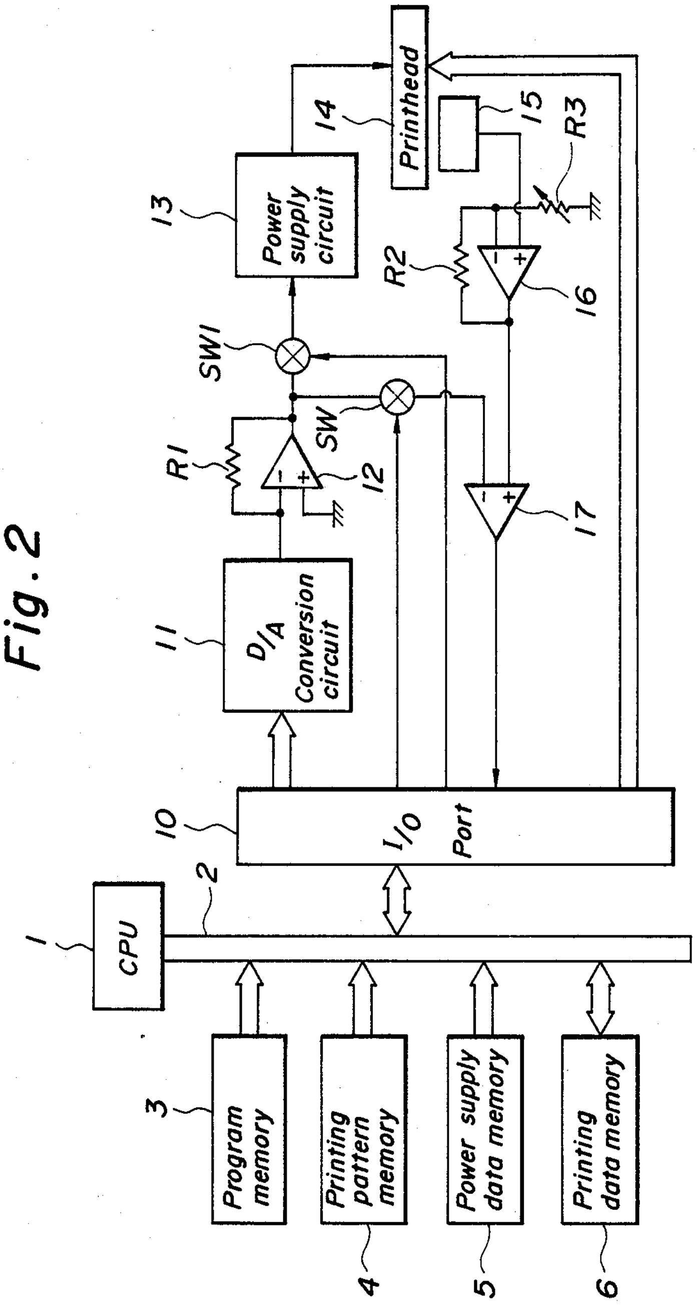
FIG. 2 is a block diagram of the circuit of the invention.

Referring to FIG. 2, there is shown a CPU 1 which controls the overall functioning of the present invention. Connected to the CPU 1 is a bus 2, which has connected to it program ROM 3, printing pattern ROM 4, power supply data ROM 5, and printing data RAM 6.

Figure 3:
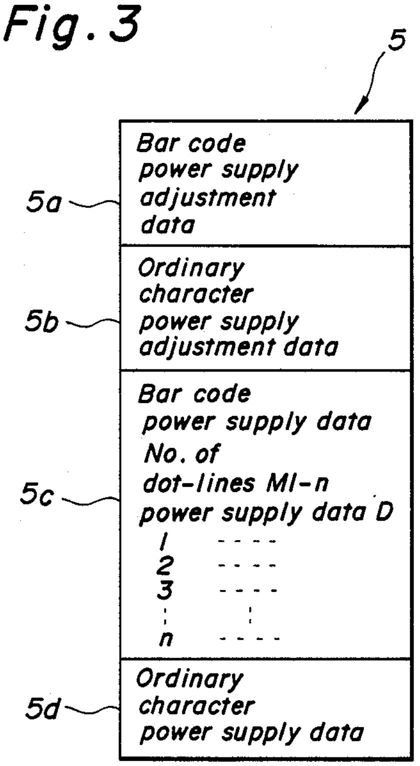
FIG. 3 is a memory map showing the specifics of the power supply data memory section.

Stored in the program memory ROM 3 are functional sequencing commands of the overall device. The CPU 1 performs or carries out these functional commands. The printing pattern memory ROM 4 contains codes corresponding to the printing of characters, symbols, bar codes and print patterns. The power supply data memory ROM 5 contains power supply control data on printing conditions corresponding to the electrical power to be supplied to the thermal printing head 14. This is shown in FIG. 3 where data is stored sequentially at specific addresses. The power supply adjustment data for bar codes and for ordinary characters are shown at 5*a*, 5*b*, respectively. Power supply data for bar codes is located at 5*c* and for the ordinary character data is at 5*d*. Encoded printing data which is inputted from an input device (not shown) is stored in the printing data memory RAM 6.

The bus 2 has an I/O port 10 connected thereto. A D/A conversion circuit 11 is connected to the input terminal of I/O port 10. The D/A conversion circuit 11 has a current signal output which is the digital value input from the CPU 1, via I/O port 10. The output terminal of D/A conversion circuit 11 is connected to the inverting input terminal of an amplifier 12. The non-inverting terminal of amplifier 12 is grounded, while the output terminal is connected to the input terminal of analog switches SW1, SW2. A resistor R1 is connected to amplifier 12 to form the feedback loop. The amplifier 12 performs amplification and current to voltage conversion. The flow of current through resistor R1 corresponding to the output from D/A conversion circuit 11 results in an electrical potential at the output terminal of amplifier 12 that corresponds to the voltage drop produced by resistor R1.

The output terminal of analog switch SW1 is connected to the power supply circuit 13. Power supply circuit 13 supplies electric power to the thermal printing head 14, and is controlled by the potential appearing at the output terminal of amplifier 12. The higher the output potential of amplifier 12, the greater is the power supplied to the thermal printing head 14. Similarly, the smaller the potential, the smaller is the electrical power supplied to the thermal printing head 14.

The thermal printing head 14 is also connected to I/O port 10. A temperature detector 15 detects the temperature of the thermal printing head 14. The temperature detector produces a signal having a potential which increases as the temperature of the thermal print head 14 increases and a potential which decreases as the temperature decreases. The signal output of temperature detector 15 is inputted to the non-inverting input terminal of amplifier 16. A resistor R2 forms the feedback loop of amplifier 16. A variable resistor R3 has one end connected to the inverting terminal of amplifier 16 while the other end of R3 is grounded. The gain can be varied by changing the resistance of variable resistor R3. The output terminal of amplifier 16 is connected to the non-inverting terminal of comparator 17. The inverting input terminal of comparator 17 is connected to the output terminal of analog switch SW2. The output terminal of comparator 17 is connected to I/O port 10. The control terminal of the analog switches SW1 and SW2 are connected to I/O port 10. Switches SW1 and SW2 operate in accordance with commands from CPU 1.

Figure 4:
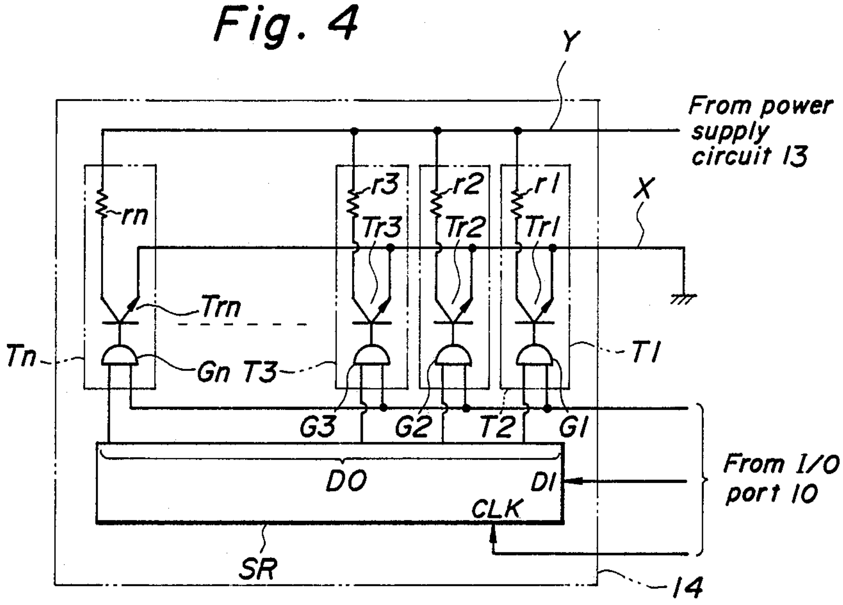
FIG. 4 is a circuit diagram showing details of the thermal print head.

Referring now to FIG. 4 it can be seen that thermal printing head 14 is comprised of a shift register SR having n heating circuits $T_1, T_2, T_3, \ldots, T_n$. The heating circuits $T_1, T_2, T_3, \ldots, T_n$ are comprised of AND gates $G_1, G_2, G_3, \ldots, G_n$, transistors $Tr_1, Tr_2, Tr_3, \ldots, Tr_n$, and heating elements $r_1, r_2, r_3, \ldots, r_n$. The shift register stores one dot-line of printing data. Data input terminal DI and clock input terminal CLK are connected to I/O port 10. Each data output terminal DO is connected to one of the input terminals of AND gates $G_1, G_2, G_3, \ldots, G_n$. The remaining input terminal of AND gates $G_1, G_2, G_3, \ldots, G_n$ are connected to each other and to an input terminal of I/O port 10. Each output terminal of AND gates $G_1, \ldots, G_n$ is connected to the base of a corresponding transistor $TR_1, TR_2, TR_3, \ldots, Tr_n$. The emitter of each transistor $Tr_1, Tr_2, Tr_3, \ldots, Tr_n$ is grounded while the collector is connected to one terminal of corresponding heating elements $r_1, r_2, r_3, \ldots$ rn. The remaining terminal of each of the heating elements $r_1, r_2, r_3, \ldots r_n$ is connected to a common terminal Y to which electric power is supplied from the power supply circuit 13.

Figure 1:
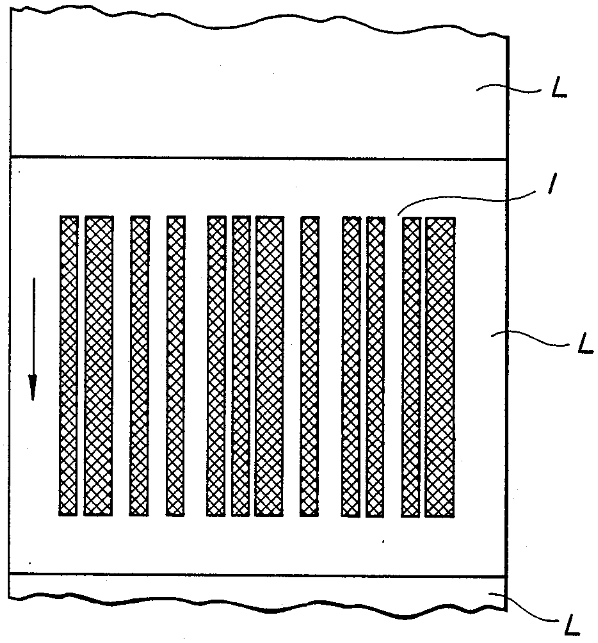
FIG. 1 is a plan view of a bar code printed on a continuous strip.
Figure 5:
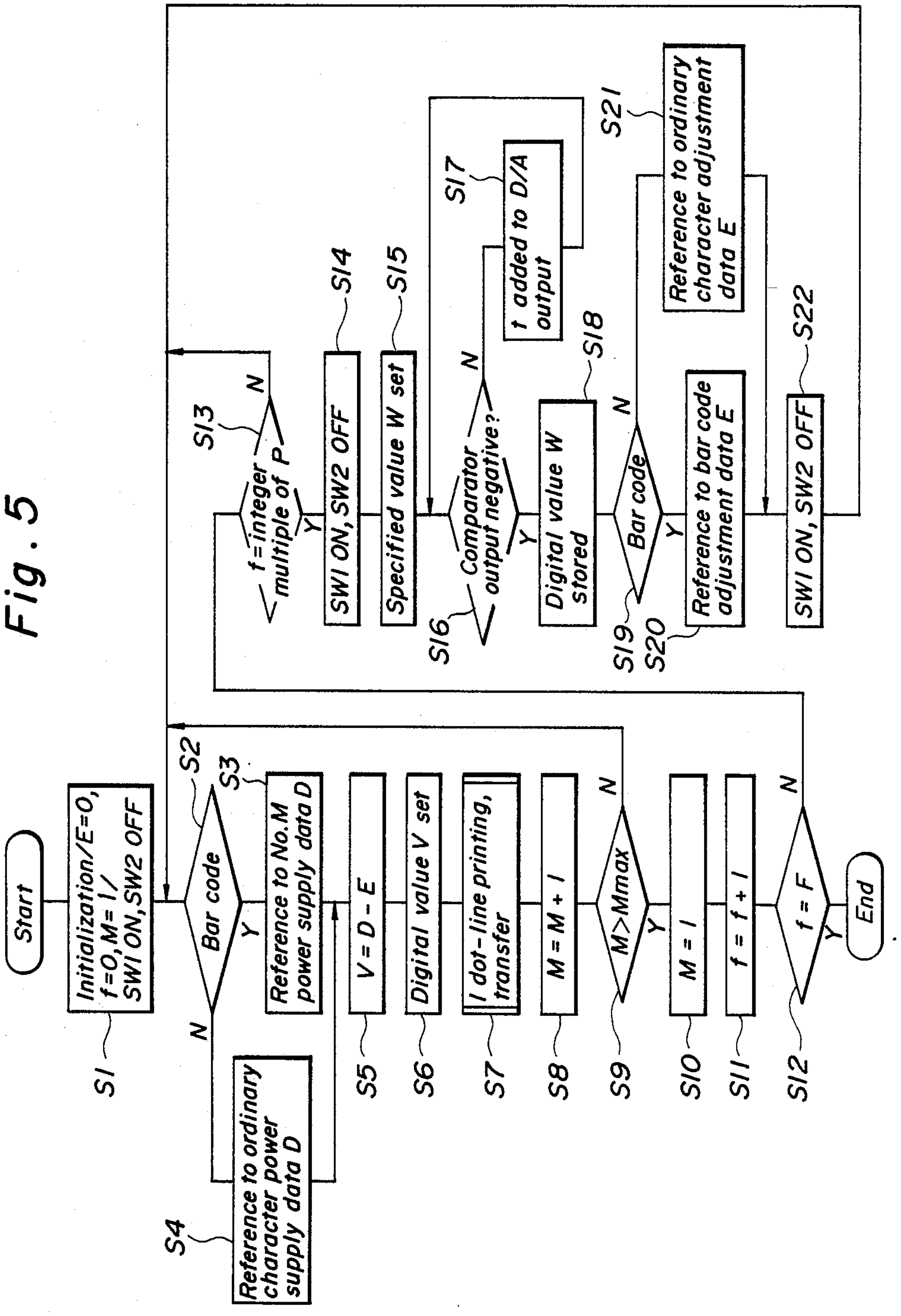
FIG. 5 is a flowchart showing temperature control processing.

Referring now to FIG. 5, the function of the thermal head temperature control device is now described. For purposes of explanation, refer to the continuous strip shown in FIG. 1, on which a number of labels L are printed. Also, it is to be assumed that the type of information to be printed and the number of printings have been previously inputted by a keyboard or some other input means and have been stored in data memory RAM 6.

Initialization takes place in step S1. During the initialization process, values for adjustment data E and the current end-of-printing number f are set to zero, while the value of number of dot-lines to be printed M is set to "1". Also, analog switch SW1 is set to ON and analog switch SW2 is set to OFF.

In step S2, it is ascertained whether a bar code is to be printed. If a bar code is to be printed, reference is made to power supply data 5*c* for the M number for the bar code which is stored in the power supply memory ROM 5 and which is used for power supply data D. Because a bar code is to be printed, the current dot-line number M is number 1, and therefore data corresponding to dot-line 1 is referred to. If what is to be printed is not a bar code, reference is made to power supply data 5*d* for ordinary characters. When ordinary characters are printed, there is no correlation to the number of dot-lines. In step S5, the digital value V which is to be supplied to D/A conversion circuit 11 is computed. This digital value V is the result of deducting adjustment data E from power supply data D of steps S3 or S4. However, in the present example the initial adjustment value E is zero and therefore digital value V is equal to power supply data D.

During the next step S6, the calculated digital value V is supplied to D/A conversion circuit 11. This tells D/A conversion circuit 11 to produce an amount of current in the feedback loop of amplifier 12 which corresponds to the input digital value V. Since resistor R1 is in the feedback loop, a voltage drop is produced. When the inverting input terminal of amplifier 12 is at zero volts and the resistance of the resistor R1 is constant, a potential appears at the output terminal of the amplifier 12 which is the product of the current flowing in the feedback loop, and the resistance of resistor R1. When this potential is inputted to the power supply circuit 13, power supply circuit 13 will supply an amount of electrical power corresponding to this potential to the common terminal Y of thermal printing head 14.

In step S7, the amount of travel and printing which corresponds to the first dot-line on the first label L is performed. This printing is carried out in accordance with the one dot-line print pattern data entered in the shift register SR, by referring to the printing pattern memory ROM 4, which is based upon printing data from printing data memory RAM 6. The print pattern data in the shift register SR is outputted via AND gates $G_1, G_2, G_3, \ldots, G_n$ for the duration of the time the print command signal is being applied to the common terminals of AND gates $G_1, G_2, G_3, \ldots, G_n$. In the corresponding heating elements $r_1, r_2, r_3, \ldots r_n$, a current flows which corresponds to the potential produced across terminals X and Y. As a result, the heating elements $r_1$, $r_2$, $r_3$, . . . $r_n$ through which this current is passed, heat up, and print a single dot-line pattern on the label L.

Upon completion of printing of the one dotline and the accompanying travel, step S8 is carried out. There the number of dot-lines M which to be printed is incremented by one. Step S9 is used to determine whether all of the dot-lines have been printed. If all of the dot-lines have not been printed, steps S2 through S9 are repeated.

If ordinary characters are being printed and high precision is not required, reference is continuously made to the same power supply data D from the ordinary character supply power data 5_d_. If a bar code is being printed, however, reference is made to power supply data D at bar code supply data 5_c_ which corresponds to the number of dot-lines M to be currently printed. The potential that is based on this data is supplied to the D/A conversion circuit 11. If it is determined in step S9 that an amount of printing equivalent to one, label L has been completed, the number of dot-lines to be printed is set to 1 at step S10. At step S11 a 1 is added to the number of completed labels f.

Step S12 determines whether the current number of printing-completed labels f has reached the required number of labels F to be printed as preset in the printing data memory RAM 6. If the preset number F has not been reached, the program moves on to step S13. If the preset number F has been reached, all operations cease. Step S13 determines whether the number of printing-completed labels f is an integer multiple of a constant P. This constant P is derived from a positive natural number stored beforehand in power supply data memory ROM 5. If f is not an integer multiple of P, steps S2 through S13 are repeated until f becomes an integer multiple of P.

After it has been determined in step S13 that the number of completed printing labels f is a multiple of constant P, that is, setting the potential to be supplied to the power supply circuit 13 after reference has been made to adjustment data E, the result of deducting the adjustment data E from the power supply data D is used as the digital value V which is set into D/A conversion circuit 11.

When f is an integer multiple of P, step S14 is used to set switch SW1 to OFF and switch SW2 to ON. Thereafter in step S15, the output of D/A conversion circuit 11 is set to the specified digital value W. This digital value W is preferably very small. As mentioned, the effect of the D/A conversion circuit 11 is to cause a current flow in the feedback loop of the amplifier 12 which corresponds to the digital value W. This therefore causes a voltage drop corresponding to the current to be produced across resistor R1. The result is that, at the output of amplifier 12 there appears a potential which corresponds to the digital value W set by the D/A conversion circuit 11. This potential is applied, via analog switch SW2, to the inverting input terminal of the comparator 17. Comparator 17 compares the potentials of the output terminals of amplifiers 12 and 16 and outputs a signal which corresponds to the polarity of the higher potential.

Step S16 determines whether the signal output by comparator 17 is negative. When the digital signal set by D/A conversion circuit 11 is very small and therefore the potential appearing at the output terminal of the amplifier 12 is low, comparator 17 will output a positive signal. When the output is positive steps S16 and S17 are repeated. This repetition causes the digital value W which is set by D/A conversion circuit 11 to increase in increments of t until the potential at the output terminal of amplifier 16 becomes higher than the potential at the output terminal of amplifier 12. The output of comparator 17 will then invert from positive polarity to negative polarity. When comparator 17 output goes negative, the digital value W being supplied by D/A conversion circuit 11 is stored in step S18 at a specific address in the printing data memory RAM 6. This stored value correlates or corresponds to the present temperature of thermal printing head 14.

During step S19, it is again determined whether the information being printed is in bar code form. Should the information be in bar code form, reference is made in step S20 to the bar code power supply adjustment data 5a in the power supply data memory ROM 5 corresponding to the digital value W. The reference adjustment data E is stored at a specific address in the printing data memory RAM 6. It is then determined what the multiple of constant P is for the number of printing-finished labels f for bar codes and for ordinary characters. The adjustment data E is then varied accordingly. The higher the multiple, the larger the value of the adjustment data E. When adjustment data E has been set, step S22 sets analog switch SW1 to ON and analog switch SW2 to OFF. Thereafer, the program reverts to step S2.

By repeating steps S2 through S22, the specified printing is carried out on a number F of labels L.

Thus, with respect to rough temperature changes in thermal printing head 14, the power supply to the thermal printing head 14 is controlled by reference to the bar code power supply adjustment data 5_a_ or the ordinary character power supply adjustment data 5_b_ in accordance with temperature detector 15. With respect to changes in the thermal head temperature for each dot-line, the power supply for the thermal printing head 14 is controlled by reference to the bar code power supply data 5_c_.

An alternate embodiment in which the detection of the temperature of the thermal printing head 14 by temperature detector 15 is not used will now be described. Accordingly, temperature detector 15, amplifier circuit 16, comparator 17, analog switches SW1, SW2 and resistors R2 and R3 are not required. However, the remaining portions of the embodiment are the same as those in FIG. 2.

Figure 6:
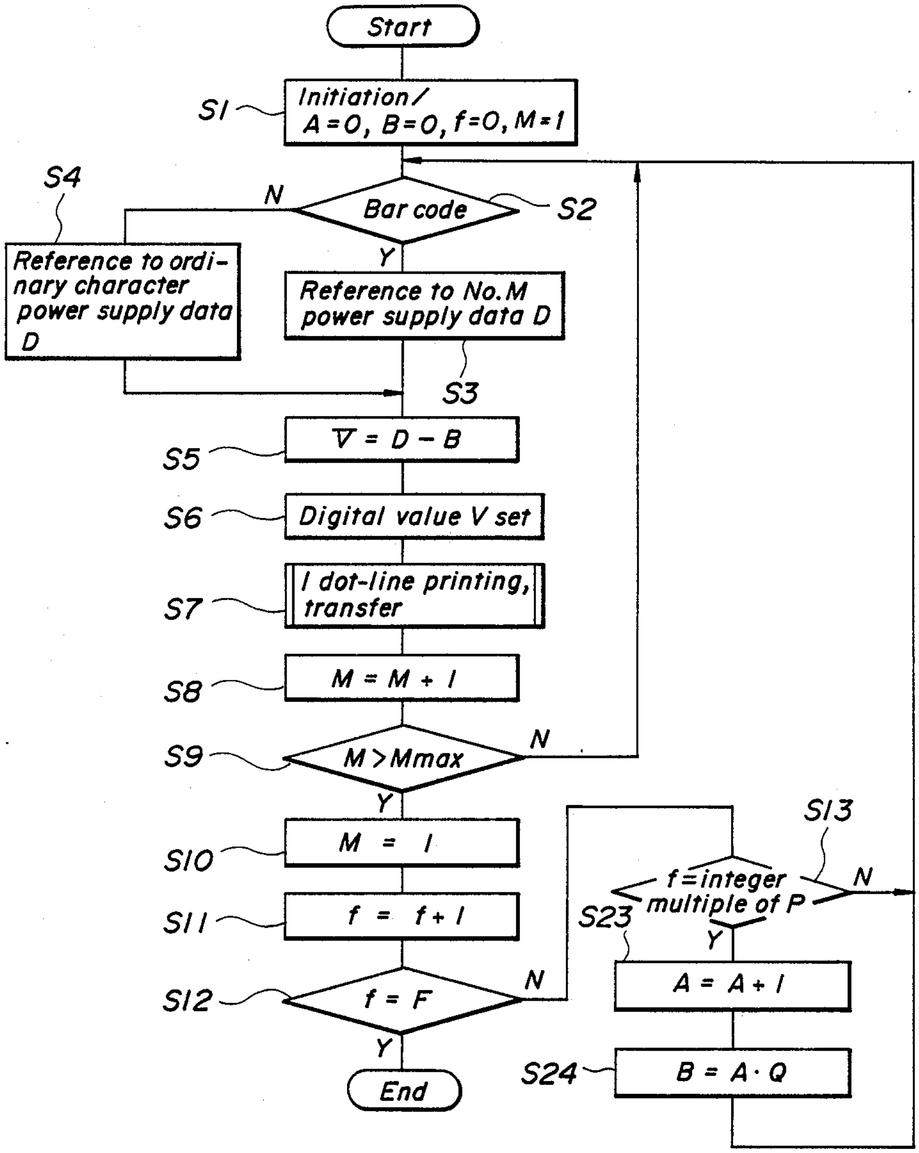
FIG. 6 is a flowchart showing temperature control processing by an alternate embodiment of the present invention.

FIG. 6 illustrates this alternate embodiment. However, since previously explained steps S2 through S13 are the same, further explanation will not be given. Initialization again starts in step S1. The number of condition-matched repetitions A, which equals the number of printing-finished labels f necessary to become an integer multiple of constant P, is set to zero. B, which is the product of repetitions A multiplied by constant Q, is also set to zero. The number of printing-completed labels f is also set to zero, while the number of dot-lines to be printed M, is set to 1.

If in step S13 it is determined that the number of printing-completed labels f is a multiple of constant P, step S23 will add a one to the number of conditions-matched repetitions. The process then moves to step S24, in which repetitions A are multiplied by constant Q. The product of the two is value B, which is stored at a specific address in the printing data memory RAM 6. Digital value V, which is supplied to D/A converter 11 in subsequent functions, is the result of deducting value B from the power supply data D obtained by reference to the bar code power supply data 50 or the ordinary character power supply data 5*d*. In the embodiment as shown in FIG. 5, temperature detector 15 detects the temperature of the thermal printing head 14 each time P number of labels L has been printed. On the basis of this detected temperature, reference is made to adjustment data 5*a* or 5*b* and the supply of electric power to thermal printing head 14 is varied accordingly. However, in the embodiment shown in FIG. 6, the digital value supplied to the D/A conversion circuit 11, after each printing of P number of labels L is decremented by A. This reduces the amount of power supplied to the thermal printing head 14 from the power supply circuit 13.

Further, when a 1 is detected in accordance with the program stored in the program memory ROM 3, reference is made to power supply adjustment data 5*a* and 5*b* and a digital value V is provided that is adjusted with respect to D/A conversion circuit 11. The electrical power supplied from power supply circuit 13 to thermal printing head 14 is thereby adjusted in the manner previously described. It is also possible for the power to be adjusted by applying the signal output of amplifier 16 directly to power supply circuit 13, and for power supply circuit 13 itself to correct temperature fluctuations in the thermal printing head 14. Therefore, there would be no temperature detection precipitated changes in the output of comparator 17 in accordance with program memory ROM 3.

Adjustment value B is computed each time P number of labels L are printed. It is also possible however for reference to be made to the adjustment data each time P number of labels L are printed by previously storing the adjustment data to be referred to, in the power supply data memory ROM 5.

The present invention comprises the use of a power supply data memory in which there is stored data for each printing condition corresponding to the power which is required by the thermal printing head. Therefore, power is supplied to the thermal printing head in accordance with printing conditions with reference to the data stored in the power supply data memory. It is therefore possible to continuously effect fine control of the heat of the heating elements of the thermal printing head in response to the nature of what is being printed. This thereby provides consistently clear and sharp printing.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A thermal printing head for printing various kinds of print type, such as bar codes, ordinary characters, and the like, comprising:

a variable output power supply for supplying electric power to said thermal printing head;

a power supply data memory having stored therein power supply control data for each kind of said print type to be printed;

means for determining the kind of a currently printed print type; and control means, responsive to the determination made by the determining means, and connected to said thermal printing head, to said variable output power supply and to said power supply data memory for controlling the level of the electric power supplied to said thermal printing head by said variable output power supply as a function of the power supply control data and the currently printed print type.

2. A thermal head temperature control device according to claim 1, further comprising a thermal printing head temperature detection means connected to said control means for additionally controlling the electric power supplied by said variable output power supply to said thermal printing head as a function of the temperature of said thermal printing head.

3. A thermal printing head for printing various kinds of print type such as bar codes, ordinary characters and the like, comprising:

a variable output power supply for supplying electric power to said thermal printing head;

a power supply data memory having stored therein power supply control data for each kind of said print type to be printed;

means for determining the kind of a currently printed print type;

temperature detection means for detecting the temperature of said thermal printing head; and control means, responsive to the determination made by the determining means, and connected to said thermal printing head, to said variable output power supply, to said power supply data memory and to said detection made by said temperature detection means for controlling the level of the electric power supplied by said variable output power supply to said thermal printing head as a function of the temperature of said printing head and as a function of said power supply control data and the currently printed print type 4. A thermal printing head temperature control device according to claim 1, wherein said control means is comprised of:

a central processing unit;

an I/O unit connected to said central processing unit and to said thermal printing head for communication with said central processing unit and said thermal printing head; and variable output power supply adjustment means connected to said I/O port and to said variable output power supply for said controlling of said output of said variable output power supply.

5. A thermal printing head temperature control device according to claim 4 wherein said variable output power supply adjustment means is comprised of:

a D/A converter connected to said I/O port, said D/A converter producing an analog output signal at an analog output terminal thereat;

a first amplifier having an inverting input terminal connected to said analog output terminal, said first amplifier producing an output signal at a first amplifier output terminal thereat;

a first analog switch having a first analog input connected to said first amplifier output terminal, said first analog switch having a first analog output at a first analog output terminal thereat, said first analog output terminal being connected to said variable output power supply, said first analog switch further having a first control terminal connected to said I/O port; and a first feedback loop connected between said inverting input terminal of said first amplifier and said first amplifier output terminal.

6. A thermal printing head temperature control device according to claim 3, wherein said control means is comprised of:

a central processing unit;

an I/O port connected to said central processing unit and to said thermal printing head for communication with said central processing unit and said thermal printing head.

7. A thermal printing head temperature control device according to claim 6, wherein said variable output power supply adjustment means is comprised of:

a D/A converter connected to said I/O port, said D/A converter producing an analog output signal at an analog output termal thereat;

a first amplifier having an inverting input terminal connected to said analog output terminal, said first amplifier producing an output signal at a first amplifier output terminal thereat;

a first analog switch having a first analog input connected to said first amplifier output terminal said first analog switch having a first analog output at a first analog output terminal thereat, said first analog output terminal being connected to said variable output power supply, said first analog switch further having a first control terminal connected to said I/O port;

a first feedback loop connected between said inverting input terminal of said first amplifier and said first amplifier output terminal;

a second amplifier having a non-inverting input terminal connected to said temperature detection means, said second amplifier producing an output signal at a second amplifier output terminal thereat;

a first comparator having a non-inverting input terminal connected to said second amplifier output terminal, said first comparator producing an output signal at a first comparator output terminal thereat, said first comparator output terminal being connected to said I/O port;

a second feedback loop connected between said inverting input terminal of said second amplifier and said second amplifier output terminal; and a second analog switch having a second control terminal connected to said I/O port, and having a second input terminal connected to said first amplifier output terminal, said second analog switch having a second output terminal connected to a non-inverting input terminal of said first comparator.

8. A thermal printing head for printing various kinds of print type such as bar codes, ordinary characters and the like, comprising:

a variable output power supply for supplying electric power to said thermal printing head;

a power supply data memory having stored therein power supply control data for each kind of said print type to be printed;

means for determining the kind of a currently printed print type;

control means comprised of:

a central processing unit;

an I/O port connected to said central processing port and to said thermal printing head;

a D/A converter connected to said I/O port, said D/A converter producing an analog output signal at an analog output terminal thereat;

a first amplifier having an inverting input terminal connected to said analog output terminal, said first amplifier producing an output signal at a first amplifier output terminal thereat;

a first analog switch having a first analog input connected to said first amplifier output terminal, said first analog switch having a first analog output at a first analog output terminal thereat, said first analog output terminal being connected to said variable output power supply, said first analog switch further having a first control terminal connected to said I/O port; and a first feedback loop connected between said inverting input terminal of said first amplifier and said first amplifier output terminal for controlling the level of the electrical power supplied to said thermal printing head by said variable output power supply as a function of the power supply control data and the currently printed print type.

9. A thermal printing head temperature control device for print type such as bar codes, ordinary characters and the like, comprising:

a variable output power supply for supplying electric power to said thermal print head;

power supply data memory having stored therein printing data for each type of said print type to be printed;

temperature detection means for detecting the temperature of said thermal printing head;

control means comprised of:

a central processing unit;

an I/O port connected to said central processing port and to said thermal printing head;

a D/A converter connected to said I/O port, said D/A converter producing an analog output signal at an analog output terminal thereat;

a first amplifier having an inverting input terminal connected to said analog output terminal, said first amplifier producing an output signal at a first amplifier output terminal thereat;

a first analog switch having a first analog input connected to said first amplifier output terminal, said first analog switch having a first analog output at a first analog output terminal thereat, said first analog output terminal being connected to said variable output power supply, said first analog switch further having a first control terminal connected to said I/O port;

a first feedback loop connected between said inverting input terminal of said first amplifier and said first amplifier output terminal;

a second amplifier having a non-inverting input terminal connected to said temperature detection means, said second amplifier producing an output signal at a second amplifier output terminal thereat;

a first comparator having a non-inverting input terminal connected to said second amplifier output terminal, said first comparator producing an output signal at a first comparator output terminal thereat, said first comparator output terminal being connected to said I/O port;

a second feedback loop connected between said inverting input terminal of said second amplifier and said second amplifier output terminal; and a second analog switch having a second control terminal connected to said I/O port, and having a second input terminal connected to said first amplifier output terminal, said second analog switch having a second output terminal connected to a non-inverting input terminal of said first comparator.

* * * * *